Aug. 27, 1940.     L. LEHRFELD     2,212,945
LENSLESS PROTECTIVE SPECTACLES, GOGGLES, AND THE LIKE
Filed Nov. 19, 1937
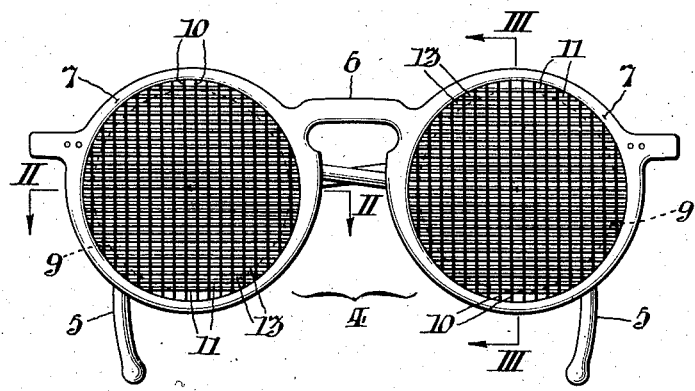
FIG. I.
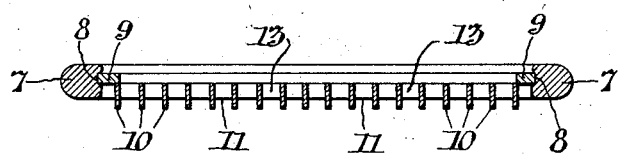
FIG. II.
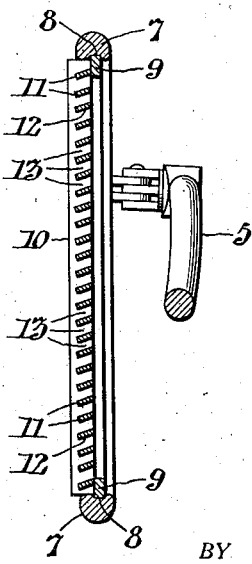
FIG. III.
WITNESSES:
INVENTOR:
Louis Lehrfeld,
BY
ATTORNEYS.

Patented Aug. 27, 1940

2,212,945

UNITED STATES PATENT OFFICE 2,212,945

LENSLESS PROTECTIVE SPECTACLES, GOGGLES, AND THE LIKE

Louis Lehrfeld, Philadelphia, Pa.

Application November 19, 1937, Serial No. 175,420

2 Claims. (Cl. 2—14)

This invention relates to spectacles, goggles and the like devised for the protection of the wearer's eyes against injurious flying matter and the detrimental effects of excessive light.

The primary object of the invention is to provide a novel form of lensless spectacles or goggles for protecting the eyes of workers in many industries and fields of labor where injury by particles and pieces of flying matter is likely to occur.

Another object is to provide spectacles or goggles of the above indicated type for use by motor drivers and others which embody protective substitutes, for conventional lens, said substitutes including rectangular cells of predetermined dimensions surrounded by walls which serve as effective deflectors against the ingress of flying matter or excessive light rays that normally interfere with clear vision.

A further object is the provision of spectacles or goggles as referred to in the preceding paragraph that will filter out substantially seventy-five percent of the dangerous rays of excessive light, such as heat and light rays, and more particularly those commonly known as ultra-violet and infra-red rays.

A still further aim of this invention is the provision of a novel type of spectacles or goggles that will absorb light in the ultra-violet and infra-red portion of the spectrum in sufficient amounts to protect the eyes from injury.

Another aim of the invention is to furnish spectacles or goggles characterized by most of the safety inhering to glass lens while eliminating the dangers incident to fracture of such lens, as well as removing all possibility of "cloudiness" when worn under various conditions of temperature and humidity, and thereby keeping the eyes cool and free from inflamation.

With the foregoing objects and incidental advantages in view, this invention essentially consists of an eye protective device or substitute lens preferably formed of minimum thickness elements so interengaged as to define rectangular cells having vertical side walls with the intervening ones inclined downwards in respect to the horizontal.

In the drawing:

Fig. I is a front view of a pair of spectacles embodying the subject-matter of this invention.

Fig. II is a horizontal section taken on the plane designated II—II in the preceding illustration, but drawn to an enlarged scale and looking in the direction of the arrows; and, Fig. III is a vertical section on the line III—III of Fig. I, likewise drawn to a larger scale.

Referring more in detail to the drawing, a conventional pair of spectacles, including a frame 4 with temples 5 and a bridge 6, is illustrated; the same being preferably, although not essentially, made of any appropriate composition or substance. Each lens rim 7, as best shown in Figs. II and III, is of appropriate cross-section to define an inner surrounding groove 8 in which is sprung, or otherwise secured, a metal retainer ring 9, preferably of rectangular cross-section. To the retainer ring 9 there is securely fixed the substitute lens or protective device of this invention, the same embodying a plurality of vertically positioned elements or comparatively narrow metal strips or bars 10, which are intersectingly engaged horizontally by relatively narrower corresponding bars 11 of like material. In practice the bars 11 engage downwardly inclined slots 12 in the bars 10, with respect to the eyes of the wearer; or in other words the interengaging connection may be defined as of "egg-carton" formation. Thus it will be seen there are provided multiple apertures or cells 13 designed or directed at an angle to ensure clear vision, yet possessing sufficient front-to-back depth for effectually preventing the entrance of foreign bodies, metal or liquid for example, to the wearer's eyes while providing sufficient ventilation to avoid sweating.

More specifically, the vertical bars 10 intersect the horizontal bars 11 at right angles, said bars having a width or depth from front to back of 1.5 millimeters or more. In the illustrations, the vertical bars 10 are shown as being slightly wider than the horizontal ones 11, while the latter are downwardly inclined from back to front at an angle of eighteen degrees. Thus it will be readily understood that each cell 13 is defined by two vertical walls with a top and bottom, or roof and floor, each inclined at an angle of eighteen degrees below the horizontal in the line of normal vision. Further, it is to be noted the horizontal bars 11 are preferably spaced apart by one millimeter, whereas the vertical bars 10 are separated by a distance of two millimeters. This spacing of the bars 10, 11 and the stated inclination of the latter are so arranged in accordance with the dioptric system of the eye, as to ensure the maximum area of vision while, at the same time absorbing, reflecting and dispersing the total quantity of light and heat waves in sufficient amunts to safeguard the eyes from injury.

While there has been illustrated and described one embodiment of the invention, it is to be understood that minor changes, substitutions and the like may be made therein without departing from the spirit of said invention or the scope of the concluding claims. For instance, the multiplicity of the cells or apertures 13, the depth and size thereof, may be varied as the exigencies of particular usage call for; while it will be fully apparent the depth of the apertures 13 and their angulation act as shielding targets against flying solids or injurious fluids, and afford ample ventilation so as to prevent the accumulation of moisture tending to mar clear vision.

Having thus described my invention, I claim:

1. Protective goggles comprising a pair of cellular foraminous eye screens, a connecting nose bridge, and means for holding the goggles in front of the wearer's eyes, each said eye screen including a series of spaced horizontal thin bars with their flat faces disposed transversely to the plane of the screen for diminishing glare, reflecting heat, and deflecting flying particles of solid matter, and a series of corresponding intersecting vertical thin bars with their flate faces similarly disposed and having like properties, said latter bars projecting forwardly beyond the plane of the first mentioned bars and, jointly with the latter, defining cells effective to aircool the wearer's eyes.

2. Protective goggles according to claim 1, in which the horizontal bars are closely spaced uniformly and pitched at a slight angle forwardly-down, and the vertical bars are likewise spaced uniformly but by a greater interval than the transverse bars.

LOUIS LEHRFELD.